United States Patent [19]

Ikeda

[11] Patent Number: 4,858,435
[45] Date of Patent: Aug. 22, 1989

[54] FLUID PRESSURE CONTROL CIRCUIT FOR WORKING VEHICLE HAVING TRANSMISSION OPERABLE BY FLUID PRESSURE

[75] Inventor: Kenji Ikeda, Sakai, Japan
[73] Assignee: Kubota Ltd., Osaka, Japan
[21] Appl. No.: 142,960
[22] Filed: Jan. 12, 1988

[30] Foreign Application Priority Data

May 9, 1987 [JP] Japan .................... 62-69543[U]
May 11, 1987 [JP] Japan .................... 62-70346[U]

[51] Int. Cl.$^4$ .............................................. F16D 31/02
[52] U.S. Cl. ........................................ 60/441; 60/442; 60/490
[58] Field of Search ............... 60/435, 437, 438, 441, 60/442, 490

[56] References Cited

U.S. PATENT DOCUMENTS

| | | | |
|---|---|---|---|
| 3,654,762 | 4/1972 | Damon | 60/441 |
| 4,317,331 | 3/1982 | Aruga et al. | 60/441 |
| 4,395,878 | 8/1983 | Morita et al. | 60/444 |
| 4,464,898 | 8/1984 | Aoyagi et al. | 60/442 |
| 4,481,769 | 11/1984 | Nagahara | 60/442 |
| 4,495,767 | 1/1985 | Akiyama et al. | 60/442 |
| 4,543,786 | 10/1985 | Shuler | 60/435 |
| 4,566,274 | 1/1986 | Heiser et al. | 60/444 |

FOREIGN PATENT DOCUMENTS

| | | | |
|---|---|---|---|
| 0082801 | 6/1980 | Japan | 60/435 |
| 0641176 | 1/1979 | U.S.S.R. | 60/435 |
| 2072308 | 9/1981 | United Kingdom | 60/435 |

*Primary Examiner*—Robert E. Garnett
*Assistant Examiner*—Thomas Denion
*Attorney, Agent, or Firm*—Gifford, Groh, Sheridan, Sprinkle and Dolgorukov

[57] ABSTRACT

A fluid pressure control circuit for a working vehicle having a transmission operable by a fluid pressure and a negative type fluid pressure parking brake. The control circuit comprises a fluid pressure cylinder movable to a first end position to place the transmission in a low speed position and to a second end position to place the transmission in a high speed position, a fluid supply line for supplying pressure fluid to the cylinder, and a control valve mounted on the fluid supply line. The control valve comprises a three position valve having a first position to release the pressure fluid from the parking brake and the fluid supply line, a second position to supply the pressure fluid to the parking brake and set the cylinder to the first end position, and a third position to supply the pressure fluid to the parking brake and set the cylinder to the second end position.

4 Claims, 1 Drawing Sheet

FLUID PRESSURE CONTROL CIRCUIT FOR WORKING VEHICLE HAVING TRANSMISSION OPERABLE BY FLUID PRESSURE

BACKGROUND OF THE INVENTION

The present invention relates to a fluid pressure control circuit for a working vehicle having a transmission operable by a fluid pressure. To be particular, the control circuit comprises a fluid pressure actuator for controlling the transmission, a fluid supply line for supplying pressure fluid to the actuator, a negative type fluid pressure parking brake connected to the fluid supply line, and control valve means mounted on the fluid supply line. This control valve means has at least a first position to release the pressure fluid from the parking brake and a second position to supply the pressure fluid to the parking brake.

For parking the working vehicle with a known fluid pressure control circuit as noted above, a parking brake control valve acting as the control valve means is operated to a braking position or the first position to release the pressure fluid from the parking brake to a return oil line thereby to actuate the parking brake. At the same time, a change speed control valve is operated to neutral to stop the propelling drive through the actuator and the transmission and to release an excess fluid pressure in the fluid supply line through a relief valve.

According to the known control circuit, therefore, a fluid pressure may be produced in the fluid supply line regardless of the position of the brake control valve. Consequently, the fluid pressure actuator may be moved to a drive position to start the vehicle when the change speed control valve is operated to a forward or backward drive position in a parking state with the brake control valve set to the braking position, namely with a brake release operation being forgotten. This results in a seizure of the negative type parking brake. It is possible to provide a negative brake having a capacity exceeding the propelling force so that the vehicle is braked against movement and the seizure of the brake is avoided even when a vehicle starting operation is effected forgetting a brake release operation. However, such a large capacity negative brake is expensive.

SUMMARY OF THE INVENTION

The object of the present invention is to provide a fluid pressure control circuit effective to prevent a negative brake seizure due to a brake release operation being forgotten, without increasing the cost of the negative brake.

The above object is achieved according to the present invention by a fluid pressure control circuit for a working vehicle having transmission means operable by a fluid pressure, comprising fluid pressure actuator means for controlling the transmission means, a fluid supply line for supplying pressure fluid to the fluid pressure actuator means, fluid pressure parking brake means connected to the fluid supply line, the fluid pressure parking brake means being a negative type brake operable by a fluid pressure to release parking brakes, and control valve means mounted on the fluid supply line and having at least a first position to release the pressure fluid from the fluid pressure parking brake means and a second position to supply the pressure fluid to the fluid pressure parking brake means, wherein the control valve means is constructed to release the pressure fluid from the fluid supply line when in the first position.

With the above construction, when the control valve means is operated to the first position or a brake operating position, the fluid supply line is connected to a return line through the control valve means. Consequently, when the vehicle is parked with the control valve means operated to the brake operating position, the pressure fluid in the fluid supply line is allowed to flow into the return line. This renders the fluid pressure actuator for controlling the transmission inoperable, thereby to retain the transmission in a neutral state.

Thus, the control circuit according to the present invention is effective to avoid a negative brake seizure even when a brake release operation is forgotten. This advantage is realized by using an inexpensive, small capacity negative brake.

It is further advantageous if, according to one embodiment of this invention, the control valve means comprises a three position valve which, when in the second position, sets a hydraulic cylinder to a first end position and, when in a third position, sets the cylinder to a second end position. This construction permits a change speed control valve and a brake control valve to be integrated into a unit, thereby to simplify the control circuit and to lower the cost thereof.

Other objects, features and advantages of the invention will be apparent from the following description referring to the drawings.

DESCRIPTION OF THE PREFERRED EMBODIMENT

Figure 1:
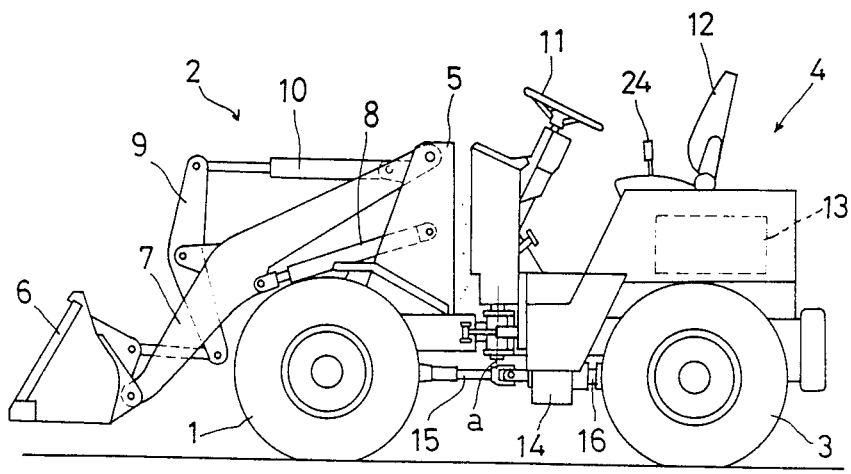
FIG. 1 is a side elevation of a wheel loader employing a hydraulic control circuit embodying the present invention.

FIG. 1 shows a four wheel drive loader which is one example of working vehicle employing a fluid pressure control circuit according to the present invention. In this example, oil is used as pressure medium. The loader comprises a front frame 2 having a pair of right and left front wheels 1 and a rear frame 4 having a pair of right and left rear wheels 3, the two frames being interconnected to be pivotable relative to each other on a vertical axis. The front frame 2 includes an upstanding bracket 5, to an upper end of which a shovel arm 7 is vertically oscillatably connected. The shovel arm 7 carries a bucket 6 pivoted to a distal end thereof. The front frame 2 further includes a pair of right and left lift cylinders 8 for driving the shovel arm 7, and a tilt cylinder 10 for driving the bucket 6 through a tilt arm 9. The rear frame 4 includes a steering wheel 11, a driver's seat 12, an engine 13 and a transmission case 14. Drive is transmitted from the transmission case 14 to the front wheels 1 through a transmission shaft 15 and to the rear wheels 3 through a transmission shaft 16.

The wheel loader is steered by turning the steering wheel 11 to cause the front frame 2 to pivot right and left relative to the rear frame 4.

The transmission case 14 houses a hydraulic transmission acting as change speed means and including a swash plate type axial plunger hydraulic pump P driven by the engine 13 and a swash plate type axial plunger hydraulic motor M for driving an output shaft. This hydraulic transmission switches between forward drive and backward drive and effects stepless running speed changes on the forward drive and the backward drive through variations in a swash plate angle of the hydraulic pump P, and provides two, high and low, running speed ranges through variations in a swash plate angle of the hydraulic motor M.

A differential case connected to the rear wheels 3 includes a hydraulically operable negative parking brake 17. This negative parking brake 17 is releasable by a hydraulic pressure and is operable to apply brakes by a spring force or the like when the hydraulic pressure is removed.

Figure 2:
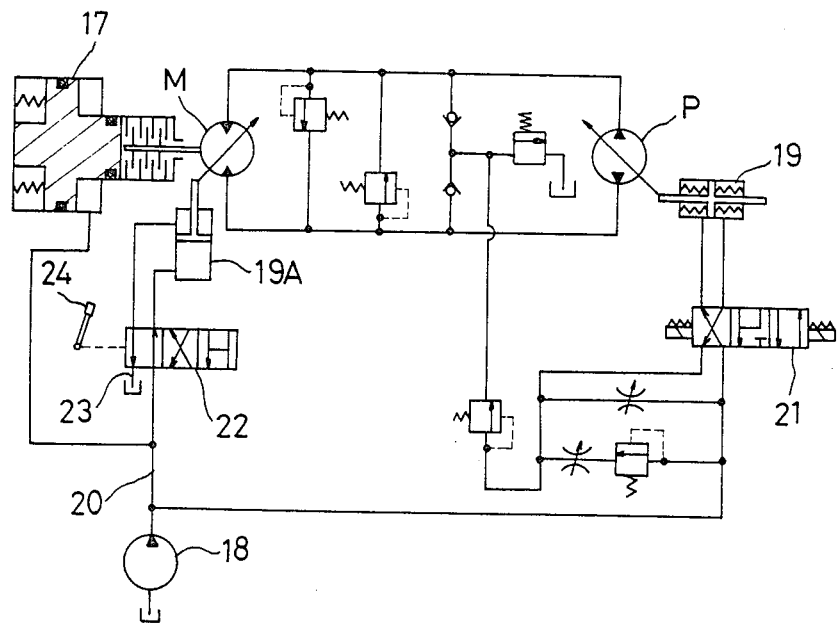
FIG. 2 is a diagram of a hydraulic control circuit according to one embodiment of the present invention.

FIG. 2 shows a hydraulic control circuit for controlling the hydraulic transmission and the negative brake 17. This circuit includes a charge pump 18 to produce an oil pressure for operating three elements, i.e. a first hydraulic cylinder 19 acting as main change speed hydraulic cylinder for varying the swash plate angle of the hydraulic pump P, a second hydraulic cylinder 19A acting as auxiliary change speed hydraulic cylinder for varying the swash plate angle of the hydraulic motor M, and the negative brake 17. The first hydraulic cylinder 19 and second hydraulic cylinder 19A constitute hydraulic actuator means for controlling the transmission. Oil supply lines 20 include a main change speed control valve 21 for controlling oil supply to the first hydraulic cylinder 19, an auxiliary change speed control valve 22 for controlling oil supply to the second hydraulic cylinder 19A, and a brake control valve 22 for controlling oil supply to the negative brake 17. The auxiliary change speed control valve and brake control valve are integrated into a unit.

The main change speed control valve 21 comprises an electromagnetic three position valve having a forward drive position for operating the first hydraulic cylinder 19 to a high speed forward drive position, a backward drive position for operating the first hydraulic cylinder 19 to a high speed backward drive position, and a neutral position for returning the first hydraulic cylinder 19 to a stop position.

The integrated auxiliary change speed and brake control valve 22 comprises a three position valve having a high speed position for operating the second hydraulic cylinder 19A to a high speed position, a low speed position for operating the second hydraulic cylinder 19A to a low speed position, and a brake operating position for connecting the oil supply line 20 to a return line 23 to remove the oil pressure from the negative brake 17. This three position control valve 22 has a construction to connect the second hydraulic cylinder 19A as well to the return line 23 when in the brake operating position.

Thus, the three position control valve 22 is operable by a single control lever 24 for effecting auxiliary change speed and for applying parking brakes.

According to the foregoing embodiment, the oil in the oil supply line 20 and in the negative brake 17 is drained to the return line 23 when the main change speed control valve 21 is moved to the neutral position and then the three position control valve 22 is moved to the brake operating position. In this state, even if the main change speed control valve 21 is moved to the forward drive position or the backward drive position, the change speed actuator, or the main change speed hydraulic cylinder 19, remains inoperative and no propelling force is produced.

In the described embodiment, the three position control valve 22, when in the brake operating position, connects the auxiliary change speed hydraulic cylinder 19A as well to the return line 23. Alternatively, this control valve may be constructed to connect only the oil supply line 20 to the return line 23 when in the brake operating position.

Further, in the described embodiment, the transmission controlled by the hydraulic circuit comprises a hydraulic transmission. However, the transmission may comprise any other type of transmission.

What is claimed is:

1. A fluid pressure control circuit for a working vehicle having transmission means operable by a fluid pressure, comprising:

fluid pressure actuator means for controlling said transmission means said actuator means including a first cylinder acting to control a main change speed operation of said transmission means and a second cylinder acting to control an auxiliary change speed operation of said transmission means, said second cylinder being movable to a first end position to place said transmission means in a low sped position and to a second end position to place said transmission means in a high speed position, a fluid supply line for supplying pressure fluid to said first and second cylinders of said fluid pressure actuator means, fluid pressure parking brake means connected to said fluid supply line, said fluid pressure parking brake means being a negative-type brake operable by fluid pressure to release parking brakes, and control valve means mounted on said fluid supply line and having a first position to release the pressure fluid from said fluid supply line and thereby from said fluid pressure parking brake means and a second position to supply the pressure fluid to said fluid pressure parking brake means, and to control the supply of the pressure fluid from said fluid supply line to said fluid pressure actuator means in order to set said second cylinder selectively to said first end position and said second end position.

2. A fluid pressure control circuit as claimed in claim 1 wherein said control valve means comprises a three position valve which, when in said second position, sets said second cylinder to said first end position and, when in a third position, sets said second cylinder to said second end position.

3. A fluid pressure control circuit as claimed in claim 1 wherein said transmission means includes a swash plate type axial plunger pump and a swash plate type axial plunger motor, said first cylinder being operable to vary a swash plate angle of said swash plate type axial plunger pump, and said second cylinder being operable to vary a swash plate angle of said swash plate type axial plunger motor.

4. A fluid pressure control circuit for a working vehicle comprising;

hydraulic transmission means including a swash plate type axial plunger pump and a swash plate type axial plunger motor, a charge pump, a first hydraulic cylinder for varying a swash plate angle of said swash plate type axial plunger pump, a second hydraulic cylinder for varying a swash plate angle of said swash plate type axial plunger motor, said second hydraulic cylinder being movable to a first end position to place said transmission means in a low speed position and to a second end position to place said transmission means in a high speed position,
a pressure oil supply line for supplying pressure oil from said charge pump to said first and second hydraulic cylinders,
hydraulic parking brake means connected to said pressure oil supply line, said hydraulic parking brake means being a negative type brake operable by a hydraulic pressure to release parking brakes,
a control valve mounted on said pressure oil supply line for controlling said first hydraulic cylinder, and
a three position hydraulic control valve mounted on said pressure oil supply line and having a first position to release the pressure oil from said hydraulic parking brake means and said pressure oil supply line, a second position to supply the pressure oil to said hydraulic parking brake means and set said second hydraulic cylinder to said first end position, and a third position to supply the pressure oil to said hydraulic parking brake means and set said second hydraulic cylinder to said second end position.

* * * * *